United States Patent
Fyles et al.

[19]

[11] Patent Number: 5,962,354
[45] Date of Patent: *Oct. 5, 1999

[54] COMPOSITIONS FOR HIGH TEMPERATURE FIBERISATION

[76] Inventors: Kenneth M. Fyles, 9 Langolme Road, Garswood, Wigan, Lancashire, WN4 0SE; Peter Shorrock, 19 Ash Grove, Standish, Lancashire, WN6 0DZ; Michael R. Davidson, 84 Banks Road, Southport, Merseyside, PR9 8JL, all of United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/591,202

[22] Filed: Jan. 16, 1996

[51] Int. Cl.$^6$ ...................................................... C03C 3/06
[52] U.S. Cl. ................................. 501/36; 501/38; 501/70
[58] Field of Search ................................ 501/35, 36, 38, 501/70

[56] References Cited

U.S. PATENT DOCUMENTS

| | | | |
|---|---|---|---|
| 1,907,868 | 5/1933 | Powell . | |
| 3,847,626 | 11/1974 | Erickson et al. | 501/38 |
| 3,847,657 | 11/1974 | Erickson et al. | 501/38 |
| 3,876,481 | 4/1975 | Erickson et al. | 501/38 |
| 3,901,716 | 8/1975 | Rogers et al. | 501/70 |
| 4,628,038 | 12/1986 | Weirauch . | |
| 4,764,487 | 8/1988 | Lewis . | |
| 5,250,488 | 10/1993 | Thelohan et al. | 501/70 |
| 5,332,699 | 7/1994 | Olds et al. | 501/38 |
| 5,789,329 | 8/1998 | Eastes et al. | 501/36 |

FOREIGN PATENT DOCUMENTS

| | | |
|---|---|---|
| 1724613A1 | 3/1990 | U.S.S.R. . |
| 82/03386 | 10/1982 | WIPO . |
| 92/09536 | 6/1992 | WIPO . |
| 93/02977 | 2/1993 | WIPO . |

*Primary Examiner*—Karl Group
*Attorney, Agent, or Firm*—Inger H. Eckert; Stephen W. Barns

[57] ABSTRACT

A composition which can be fiberized to form high quality insulation wool, and which has been formulated from naturally-occuring rock minerals such as basalts, granites, limestone, dolomite and sandstone, optionally including by-products of industrial processes such as molybdenum or steel slag and grate ash, and/or high alumina materials such as China Clay and/or boron containing minerals such as Ulexite, said composition comprising the following components, given in wt %, based on the total weight of the composition:

| | |
|---|---|
| $SiO_2$ | 51–68 wt % |
| $Al_2O_3$ | 5–18 wt % | with the total amount of $SiO_2+Al_2O_3$ being from 62 to 75 wt %,

| | |
|---|---|
| $Na_2O$ | 0–6 wt % |
| $K_2O$ | 0–5 wt % | with the total amount of $Na_2O+K_2O$ being from 0 to 7.5 wt %,

| | |
|---|---|
| MgO | 1–9 wt % |
| CaO | 8–20 wt % | with the total amount of MgO+CaO being from 12 to 27 wt %,

| | |
|---|---|
| $Fe_2O_3$ | 2–10 wt % |
| $TiO_2$ | 0–3 wt % |
| $P_2O_5$ | less than 1 wt % |
| $B_2O_3$ | 0–3 wt % | the composition having a liquidus temperature of 1225° C. or less, and a viscosity at least 1000 poise at the liquidus temperature.

13 Claims, No Drawings

COMPOSITIONS FOR HIGH TEMPERATURE FIBERISATION

The present invention relates to compositions which are suitable for fiberisation into high quality insulation wool.

Insulation wool is widely used as an insulating material. In one type of fiberisation process used to manufacture insulation wool, a molten composition at a viscosity of from 1000 poise (log 3.0) to 3000 poise (log 3.5) is spun through holes in a rotating spinner. The melt, forced through the holes in the rotating spinner by centrifugal forces, is then further attenuated into lengths of fibre by a blast of air, steam or burner gases. This type of process is generally known as the "internal centrifuging spinner process". Using this type of fiberisation process, insulation wool fibre of high quality is produced. The insulation wool fibre which is obtained is virtually free of globules of unfiberised material (commonly referred to as "shot" or "hooks"), and has a quality which produces good insulating properties.

An alternative method of producing insulation wool is one which is used when working with cheaper sources of raw materials such as basalt. This alternative method is used to produce a product known as "rock wool" and involves pouring a molten composition at a viscosity of from 10 to 100 poise on to water-cooled spinning heads or wheels. On hitting the head or wheel, the cooled melt is thrown off the head or wheel and attenuated into fibre.

This "rock wool process" is suitable for fiberising highly fluid melts which can be produced from cheap minerals such as basalt because the melt hits the spinning head or wheel at a temperature in excess of 1400° C. and well above the liquidus temperature (typically >1300° C.) of the mineral composition. However, although this process has the advantage that it can be used with cheap sources of raw materials, it has the drawback that the mineral wool obtained by this process (commonly referred to as rock wool) incorporates a considerable quantity of shot (unfiberised globules of melt), which severely reduces the insulation properties of the resultant rock wool product.

Unfortunately, the cheap compositions which are used to make insulation wool by the rock wool process have not been found to be capable of being fiberised by the internal centrifuging spinner process which produces insulation wool with little or no shot content.

The properties required for compositions which are to be fiberised by the internal centrifuging spinner process are very stringent. These requirements include:
(a) the liquidus (crystallisation) temperature of the composition must be lower than the temperature at which the fibre is spun,
(b) at the spinning temperature, the viscosity of the melt must be such that the melt is sufficiently fluid to pass through the holes in the spinning head, yet be viscous enough for the melt to be readily attenuated into insulation wool fibre. In practice, this means that for optimum fiberisation conditions, the viscosity of the molten composition in the spinner must be from 1000 poise (log 3.0) to 3000 poise (log 3.5),
(c) the composition must be capable of being fiberised at a temperature no greater than about 1050° C. because of the current limitation in the performance of spinner alloys, and
(c) the composition must be resistant to water vapour.

In order to meet all of these various requirements, compositions which have been formulated for use in an internal centrifuging spinner process for producing insulation wool usually include substantial amounts of alkali metal oxides ($Na_2O$ and $K_2O$) and also boric oxide ($B_2O_3$). The presence of these oxides has the effect of lowering the liquidus temperature of the composition to a sufficient extent for the spinner process to produce good fibre. Typically, the total amount of alkali metal oxide in the formulation is from 12 to 16 wt %, and the amount of $B_2O_3$ is from 2 to 7 wt %, based on the total weight of the composition. However, raw materials which incorporate alkali metal oxides and/or boric oxide are relatively expensive, and such raw materials significantly increase the cost of producing insulation wool.

There have recently been advances in the fabrication of internal centrifuging spinners made from certain new metal alloys (e.g. MAP 758—a nickel-chrome oxide dispersed alloy) or ceramics. Such spinners are found to be capable of operating at higher temperatures (approximately 200° C. higher) than was previously possible. Such new spinners can operate at a maximum working temperature of 1300° C., with 1250° C. being the maximum operating temperature which gives a reasonable working life to the spinners.

WO 93/02977 describes a method and apparatus for producing mineral wool from a raw material such as basalt. The fiberisation process described in this document is performed in an internal centrifuging spinner which has been modified to operate at a relatively high working temperature range of 1200 to 1400° C.

The compositions described in this document have relatively high liquidus temperatures and/or are highly fluid in their molten state. It is for this reason that the internal centrifuging spinning apparatus has to be modified so as to be capable of operating at a working temperature in the range of 1200 to 1400° C. Working at such relatively high temperature ranges with melts which have relatively high liquidus temperatures and/or are highly fluid gives rise to quite a number of practical problems in operating the internal centrifuging spinning apparatus.

We have now developed a different class of compositions formulated from cheap readily-available raw materials and which are capable of being fiberised in an internal centrifuging spinner process using an improved high temperature spinner of the type described above. The present compositions have advantages over the mineral wool compositions described in WO 93/02977 being of lower liquidus temperatures combined with higher viscosity at the liquidus temperature thus allowing them to be fiberised in an internal centrifuging spinner at lower temperatures and at more conventional viscosities which gives rise to insulating wool of very low shot content. Typically, the shot content in the insulation wool obtained from the compositions of the present invention should be such that the content of particles having a diameter greater than 63 μm is less than 5% by weight, and preferably less than 2% by weight.

The compositions of the present invention are formulated from relatively cheap, naturally-available raw materials such as basalt, granite, slags, limestone and dolomite, and/or by-products from industrial chemical processes such as molybdenum or steel slag, or from incineration processes such as grate ash, and may optionally include some additional components such as soda ash.

According to the present invention there is provided a composition which can be fiberised to form high quality insulation wool, and which has been formulated from naturally-occuring rock minerals such as basalts, granites, limestone, dolomite and sandstone, optionally including by-products of industrial processes such as molybdenum or steel slag and grate ash, and/or high alumina materials such as China Clay and/or boron containing minerals such as Ulexite, said composition comprising the following components, given in wt %, based on the total weight of the composition:

| SiO$_2$ | 51–68 wt % |
|---|---|
| Al$_2$O$_3$ | 5–18 wt % | with the total amount of SiO$_2$+Al$_2$O$_3$ being from 62 to 75 wt %,

| Na$_2$O | 0–6 wt % |
|---|---|
| K$_2$O | 0–5 wt % | with the total amount of Na$_2$O+K$_2$O being from 0 to 7.5 wt %,

| MgO | 1–9 wt % |
|---|---|
| CaO | 8–20 wt % | with the total amount of MgO+CaO being from 12 to 27 wt %,

| Fe$_2$O$_3$ | 2–10 wt % |
|---|---|
| TiO$_2$ | 0–3 wt % |
| P$_2$O$_5$ | less than 1 wt %, |
| B$_2$O$_3$ | 0–3 wt % | the composition having a liquidus temperature of 1225° C. or less, and a viscosity of at least 1000 poise at the liquidus temperature.

Compositions in accordance with the invention having the above-mentioned contents of SiO$_2$ and Al$_2$O$_3$ provide the optimum liquidus/viscosity relationship for fiberisation and give liquidus temperatures which are sufficiently low for fiberisation in an internal centrifuging spinner of the type described above.

In preferred compositions in accordance with the invention, the amount of SiO$_2$ is from 53 to 60 wt %, while the amount of Al$_2$O$_3$ is 9 to 16 wt %, more preferably 13 to 16 wt %. Preferably, the total amount of SiO$_2$+Al$_2$O$_3$ is greater than 65.5 wt %, more preferably greater than 68 wt %.

The alkali content (Na$_2$O+K$_2$O) of the compositions of the invention lies within the range 0 to 7.5 wt %. This gives compositions with the lowest liquidus temperatures but which are not too fluid for adequate fiberisation.

MgO and Fe$_2$O$_3$ are useful for improving the fire resistance of the fibre. Preferably, the total amount of MgO+Fe$_2$O$_3$ in the compositions of the invention is greater than 12 wt %, more preferably greater than 14 wt %. The amount of Fe$_2$O$_3$ may be greater than 6.0 wt %, and sometimes greater than 8.0 wt %, which is advantageous in reducing corrosion of spinners made of metal alloy and enhancing the working range of the composition.

The content of CaO of 8 to 20 wt % contributes to producing compositions having the optimum liquidus/viscosity characteristics for fiberisation in a centrifugal spinner.

The presence of B$_2$O$_3$, typically in amounts of up to 3 wt %, lowers liquidus temperatures and also improves the thermal insulation properties of the fiberised compositions of the invention.

A particularly preferred group of compositions in accordance with the invention includes those compositions comprising the following components, given in wt %, based on the total weight of the compositions:

| SiO$_2$ | 53–60 wt % |
|---|---|
| Al$_2$O$_3$ | 13–16 wt % | with the total amount of SiO$_2$+Al$_2$O$_3$ being from 66 to 75 wt %,

| Na$_2$O | 0–6 wt % |
|---|---|
| K$_2$O | 0–5 wt % | with the total amount of Na$_2$O+K$_2$O being from 0 to 7.5 wt %,

| MgO | 1–9 wt % |
|---|---|
| CaO | 8–18 wt % | with the total amount of MgO+CaO being from 12 to 25 wt %,

| Fe$_2$O$_3$ | 3–10 wt % |
|---|---|
| TiO$_2$ | 0–3 wt % |
| P$_2$O$_5$ | less than 1 wt % |
| B$_2$O$_3$ | less than 3 wt %. |

Especially preferred are compositions which exhibit a liquidus temperature of 1200° C. or less and have a viscosity at the liquidus temperature of at least 1000 poise.

P$_2$O$_5$ appears as a tramp material which adversely affects the durability of the compositions so the amount of this component is kept below 1 wt %.

Compositions in accordance with the present invention have been tested for durability according to International Standard ISO 719 and are found to fall into classification HGB3 or better. This means that the compositions of the present invention do not degrade in use to any appreciable extent and are competitive with other insulation fibres already on the market.

The compositions of the present invention are formulated from basalt and/or granite and/or slags and/or ashes which are cheap and readily available raw materials. As a result, the compositions will contain >1% iron oxide. The presence of the iron oxide makes the compositions more difficult to melt using a conventional glass tank owing to the poor thermal conductivity of iron-containing compositions. If the compositions are melted in a Cupola furnace (after briqueting of the raw materials if necessary), up to 60% iron oxide will separate out as pig iron (depending on the coke content and air volume passing through the furnace), and be tapped away from the melt.

Iron is indigenous in the batches from raw materials. Iron lowers viscosity and is beneficial on liquidus temperature only at high Al$_2$O$_3$ contents.

The iron content in a conventional furnace will contain about 20–80 wt % iron present in the ferrous form. In a Cupola furnace almost all of the iron will be present in the ferrous form. The proportion of iron in ferrous or ferric form was found not to have a noticeable effect on liquidus temperature—see results given in Examples 23 and 24 in Table IA, where composition 24 using coke as a reducing agent contains a greater proportion of iron in the ferrous state compared to composition 23 without using coke, yet both have been measured to have the same liquidus temperature.

In this specification and the accompanying claims the iron oxide content is expressed as $Fe_2O_3$ representing the total of the ferrous and ferric forms.

Titania ($TiO_2$) is present in the compositions as a tramp material; because of its high cost it is not deliberately added.

The presence of alumina ($Al_2O_3$) is found to increase the viscosity of the compositions and to lower the liquidus temperature of the melt.

MgO enters the compositions as a tramp material at the lower limit of 1 wt %. However, MgO is a desirable component and up to 4 wt % of MgO is found to improve liquidus/viscosity properties of the compositions. Larger amounts of MgO increase the liquidus temperature of the compositions, but amounts of MgO of up to 9 wt % can be tolerated.

The presence of CaO helps to control the viscosity of the compositions; within the range of 8 to 20 wt % the presence of this ingredient is found to have little effect on liquidus temperatures.

$Na_2O$ and $K_2O$ reduce liquidus temperatures but also reduce viscosity. They are present in small amounts as tramp materials in many of the formulations, but the amounts of these constituents can be increased deliberately to improve the melting behaviour of the formulations. $Na_2O$ and $K_2O$ are manufactured products and are consequently relatively expensive ingredients but a total amount of these materials of up to 7.5 wt % can be envisaged.

Compositions in accordance with the present invention are formulated by mixing appropriate quantities of natural cheaply obtainable rocks such as basalts, granites, dolerites, dolomite, limestone, and sandstone, optionally also with cheap by-products from industrial processes such as molybdenum or steel slag, and grate ash. Other readily available materials such as high-alumina materials, e.g. china clay and boron-containing materials such as Ulexite, may also be incorporated in the composition of the invention. Typical naturally occuring rock materials and modifiers which are suitable for use in formulating the compositions of the present invention are set out in Table II. This table also shows the oxide composition of these starting materials. It should be noted that basalts, granites, dolerites and natural rocks vary more widely in composition than normal ingredients and the analyses given in Table II are by way of example only. The "other oxides" referred to in Table II are normally at the impurity level and constitute MnO, BaO, $ZrO_2$ and $V_2O_5$. In the case of Molybdenum slag, the other oxides are approximately 0.4 wt % MnO, 0.4 wt % $CeO_2$, 0.2 wt % $La_2O_3$, 0.2 wt % $MoO_3$, 0.1 wt % PbO and 0.1 wt % ZnO.

To ease melting, small amounts of sodium carbonate (soda ash) may be added as long as the total soda content of the composition does not exceed 6 wt % on cost grounds. Alumina in the batch may also be boosted using small quantities of China clay or cheap minerals of high alumina content. Sands may be added to boost silica content. Slags and ashes may also be used as a cheap source of raw material. Boron-containing ores such as Ulexite can be used to introduce $B_2O_3$. Examples of all these materials are also shown in Table II.

For Cupola melting, the ingredients are fed to the furnace in charges of rocks typically 20–120 mm in size and interspersed with charges of coke. Soda is preferably absent from Cupola batches.

According to a further aspect of the present invention, there is provided a method of producing high quality insulation wool, the content of particles having a diameter greater than 63 $\mu$m in the insulation wool being less than 5% by weight, preferably less than 2% by weight, which method comprises fiberising a composition in accordance with the invention, in an internal centrifuging spinner at a temperature from 10 to 70° C. higher than the liquidus temperature of the composition and at a viscosity within the range 1000 poise (log 3.0) to 3000 poise (log 3.5).

The compositions of the present invention are fiberised in an internal centrifuging spinner at a temperature about 10–70° C. higher than the liquidus temperature of the composition.

Typically, a 200 mm diameter spinner containing 4200 holes of 0.8–1.0 mm diameter rotating at a speed of 3000 revs per minute will deliver 3 tonnes of fibre per day of average diameter 4.5 $\mu$m. Preferably, however, for commercial operation a larger diameter spinner, for example 600 mm, is used which will increase throughput to about 20 tonnes of fibre per day.

As will be seen from the data in Table IA, the compositions of the invention all have liquidus temperatures below 1225° C. with many of the melts being below 1200° C. Thus the liquidus temperatures of the present compositions are lower than the liquidus temperatures of the mineral wool compositions described in WO 93/02977, most of which have liquidus temperatures above 1230° C. The present compositions have higher viscosities (>1000 poise) at the liquidus temperature. None of the mineral wool compositions described in WO 93/02977 have viscosities >1000 poise at the liquidus temperature except those with very high liquidus temperature >1270° C. (eg. examples 5, 6, 7, 8 and 12).

The higher viscosity and lower liquidus temperature of the compositions of the present invention means that the fiberisation process by internal centrifuging in a spinner can be performed more easily. Thus, lower liquidus temperatures allow the fiberisation process to be performed at lower fiberisation temperatures without fear that crystallisation in the melt will occur while the fiberisation is taking place.

The higher viscosity at the liquidus temperature of the present compositions enables one to fiberise the compositions using conventional internal centrifuging spinner designs or spinners with relatively minor variations in design using a spinner of high temperature metal alloys or of ceramics.

The content of "shot" or "hooks" in the fiberised material will be very low (below 5%) because the compositions have a higher viscosity during the spinning process than the mineral wool compositions described in WO 93/02977.

In addition, the use of lower fiberisation temperatures will reduce corrosion of the spinner by the molten composition and will reduce elongation and creep in metal spinners; as a result, the life of the internal centrifuging spinner will be extended.

Furthermore, low liquidus temperatures combined with high viscosities increase the working range of the composition.

The present invention is illustrated further by the compositions given in Examples 9 to 22 and 25 to 33 of Table IA. The compositions of Examples 1 to 8 are given by way of comparison.

In Table IA and Table II the amounts of the oxide constituents of the compositions are given as weight percentages. The "other oxides" in Table IA emanate from the raw materials used. In Table II the term LOI means the loss of material on ignition, for example the loss of water and also of $CO_2$ from carbonates.

Example 1 is a comparative example of a typical rock wool composition made by melting 75 parts basalt with 25 parts dolomite. It can be seen that the liquidus temperature of the resulting melt is far too high for fiberisation through an internal centrifuging spinner at less than 1250° C. and its viscosity is also far too low to attenuate the melt into good quality fibre at the liquidus temperature.

The composition of Example 2 (also given by way of comparison) is a typical internal centrifuging spinner insulation wool composition showing the ideal viscosity/liquidus temperature for fiberisation using conventional spinner metals. The compositions of Examples 3 to 8 show that as the $B_2O_3$ content and amount of soda is reduced thereby to cheapen the composition, both the liquidus temperature and viscosity rise until at 7% $Na_2O$ the composition cannot possibly be fiberised by the spinner method below 1250° C. This shows that cheapening a composition simply by removal of soda does not yield a melt of the correct liquidus/viscosity properties to be fiberised even in an improved high temperature spinner.

In Table IA, compositions according to the invention are given as Examples 9 to 22 and 25 to 33. The compositions in accordance with the invention are formulated from mixtures of basalt, granite, dolerite, dolomite, sand and/or limestone, and other readily available materials as listed in Table IB, together with soda ash or concentrated alumina ore if required. Batches made up from these materials and corresponding to the compositions of Examples 9 to 22 and 25 to 33 are set out in Table IB; the quantities in Table IB are given in parts by weight. It should be noted that these batches are approximate and depend on the most recent analysis of the variable rock raw materials for which adjustments must be made during manufacture. Examples 9, 10 and 26 are assumed to lose iron due to melting with excess coke in the Cupola furnace. The composition given is that of the final fibre composition after loss of iron.

Compositions in accordance with the invention were tested for durability by the International Standard ISO 719 test. In this test, water at 98° C. is applied on grains of size 300–500 $\mu$m for 60 minutes. The alkali extracted is titrated against hydrochloric acid (0.01 molar) and the amount of acid required to neutralise the extract is quoted in milliliters of acid per gram of grains. The lower the amount of acid required, the better the durability under this test. Compositions consuming 0.2–0.85 ml HCl/gram of grains are given the classification HGB3. Although not all of the examples have been tested for durability by the ISO 719 test, it is evident that compositions according to this invention meet this classification.

The durability of the fibres is largely dependent on the alkali metal oxide content ($Na_2O+K_2O$). The greater the amount of alkali, the worse the durability. Conventional high alkali fibre contains $B_2O_3$ to improve durability.

Examples 2 and 3 demonstrate the effect of removing $B_2O_3$, i.e. the durability worsens as demonstrated by the increased amount of acid to neutralise the alkali extracted in the ISO 719 test. As the content of alkali metal oxide in the composition is progressively reduced, durability improves (see Examples 3,4, and 5).

All the compositions in accordance with the invention (Examples 9 to 22 and 25 to 33) would be expected to fit the durability classification HGB3 because the alkali concentration in these compositions is limited to 7.5%, and also because other components which are beneficial for improving durability such as silica and alumina are in abundant supply.

The composition of Example 18 was made from the following raw materials:
  303 parts Criggion Basalt
  313 parts Waterswallows Basalt
  299 parts Shap Pink Granite
  103 parts Dolomite For melting by a conventional furnace, the raw materials are ground to pass through a mesh of <1 mm and fed to the furnace as a well-mixed batch.

The basalts and granites are more variable in their chemical composition than normal raw materials. Fresh consignments of these materials are therefore analysed well in advance of feeding into the furnace and the batch constitution modified according to the raw material analyses so that the target oxide composition made therefrom is kept as constant as possible.

The composition of Example 26 can be made from the following components and melted in a Cupola furnace:

| | |
|---|---|
| Dolomite | 125 parts |
| Waterswallows Basalt | 236 parts |
| Shap Track Ballast | 202 parts |
| Hailstones Basalt | 436 parts |

The materials are fed as lumps of rock of approximately 5 cm diameter together with a charge of coke (155 kg per 1000 kg rock). About 30% of the iron oxide from the raw materials is expected to be reduced to pig iron. The original composition contains 9.1% $Fe_2O_3$ but only 6.5% $Fe_2O_3$ is expected to be present in the final product as indicated in the composition above. The burnt coke yields an ash which typically adds 0.6% $SiO_2$, 0.4% $Al_2O_3$, 0.2% CaO and 0.1% MgO to the final composition and this is also compensated for in the above composition.

TABLE 1A

| Example | COMPOSITION | | | | | | | | | | | | Viscosity Temperature | | | Liquidus | Durability |
|---|---|---|---|---|---|---|---|---|---|---|---|---|---|---|---|---|---|
| | $SiO_2$ | $Al_2O_3$ | $Fe_2O_3$ | MgO | CaO | $Na_2O$ | $K_2O$ | $SO_3$ | $TiO_2$ | $B_2O_3$ | $P_2O_5$ | Other oxides | Log 2.5 | Log 3.0 | Log 3.5 | Temperature | ml/HCl/g |
| 1 | 47.6 | 14.1 | 5.2 | 12.6 | 15.4 | 2.5 | 0.6 | — | 1.7 | — | — | MnO 0.18 | 1170° C. | — | — | >1280° C. | |
| 2 | 66.2 | 1.6 | 0.3 | 3.8 | 8 | 15.5 | 1 | 0.2 | — | 3.5 | — | — | — | 1077 | — | 945° C. | 0.35 |
| 3 | 69.3 | 1.6 | 0.3 | 4.0 | 8.7 | 15 | 0.9 | 0.2 | — | — | — | — | 1280 | 1165 | 1070 | 1000° C. | 1.04 |
| 4 | 70.6 | 1.7 | 0.3 | 4.2 | 9.2 | 13 | 0.8 | 0.2 | — | — | — | — | 1300 | 1190 | 1100 | — | 0.86 |
| 5 | 72.6 | 1.7 | 0.3 | 4.2 | 9.2 | 11 | 0.8 | 0.2 | — | — | — | — | 1350 | 1230 | 1140 | 1080° C. | 0.80 |
| 6 | 73.6 | 1.7 | 0.3 | 4.2 | 9.2 | 10 | 0.8 | 0.2 | — | — | — | — | 1375 | 1250 | 1160 | 1195° C. | |
| 7 | 74.6 | 1.7 | 0.3 | 4.2 | 9.2 | 9 | 0.8 | 0.2 | — | — | — | — | 1400 | 1270 | 1180 | 1225° C. | |
| 8 | 76.6 | 1.7 | 0.3 | 4.2 | 9.2 | 7 | 0.8 | 0.2 | — | — | — | — | — | — | — | >1280° C. | |
| 9 | 53.8 | 16 | 4 | 4 | 19 | 2 | 1 | 0.2 | — | — | — | CUPOLA MELT | 1310 | 1230 | 1160 | 1215° C. | 0.20 |

TABLE 1A-continued

| Example | SiO₂ | Al₂O₃ | Fe₂O₃ | MgO | CaO | Na₂O | K₂O | SO₃ | TiO₂ | B₂O₃ | P₂O₅ | Other oxides | Log 2.5 | Log 3.0 | Log 3.5 | Liquidus Temperature | Durability ml/HCl/g |
|---|---|---|---|---|---|---|---|---|---|---|---|---|---|---|---|---|---|
| 10 | 53.1 | 15 | 2 | 3.4 | 17.8 | 5.6 | 1.9 | 0.2 | 1.0 | — | — | CUPOLA MELT | 1280 | 1200 | 1130 | 1175° C. | |
| 11 | 57.8 | 15 | 3 | 3 | 18 | 2 | 1 | 0.2 | — | — | — | — | 1365 | 1275 | 1200 | 1210° C. | 0.28 |
| 12 | 55.6 | 14.8 | 4.9 | 3 | 16 | 2.9 | 2 | 0.2 | 0.6 | — | — | — | 1335 | 1245 | 1170 | 1195° C. | 0.34 |
| 13 | 53.8 | 14.8 | 7 | 7.3 | 11 | 3.1 | 2.2 | 0.1 | 0.7 | — | — | — | 1330 | 1220 | 1140 | 1215° C. | |
| 14 | 53.1 | 14.8 | 7 | 8 | 11 | 3.1 | 2.2 | 0.1 | 0.7 | — | — | — | 1320 | 1213 | 1135 | 1210° C. | |
| 15 | 55.5 | 14.7 | 4.1 | 3.3 | 15.9 | 2.5 | 3.2 | 0.1 | 0.7 | — | — | — | 1345 | 1255 | 1180 | 1195° C. | 0.34 |
| 16 | 53.0 | 14.8 | 4.4 | 3.3 | 17.3 | 4.9 | 1.6 | 0.1 | 0.6 | — | — | — | 1270 | 1190 | 1120 | 1180° C. | |
| 17 | 55.2 | 14.7 | 8.9 | 3.5 | 10 | 3.0 | 2.2 | 0.3 | 1.7 | — | 0.3 | 0.2 | 1390 | 1295 | 1215 | 1205° C. | |
| 18 | 55.6 | 14.8 | 7 | 7.3 | 9 | 3.2 | 1.7 | 0.1 | 1.0 | — | 0.1 | 0.2 | 1340 | 1250 | 1175 | 1190° C. | |
| 19 | 56.9 | 14.6 | 9.1 | 3.2 | 8.9 | 2.7 | 2.5 | 0.4 | 1.5 | — | 0.1 | 0.1 | 1430 | 1325 | 1240 | 1225° C. | |
| 20 | 57.0 | 14.8 | 4.1 | 1.1 | 16.0 | 1.9 | 4.3 | 0.1 | 0.6 | — | 0.1 | — | 1390 | 1280 | 1200 | 1180° C. | |
| 21 | 56.2 | 9 | 4.7 | 3.9 | 19.3 | 3.7 | 1.2 | 0.2 | 1.0 | — | 0.6 | 0.2 | 1318 | 1235 | 1160 | 1220° C. | 0.14 |
| 22 | 61.6 | 9 | 3 | 3.3 | 17.0 | 3.1 | 2.2 | 0.1 | 0.6 | — | — | 0.1 | 1360 | 1255 | 1175 | 1210° C. | |
| 23 | 62 | 9 | 5 | 4 | 17 | 2 | 0.8 | 0.2 | — | — | — | NO COKE | 1360 | 1255 | 1175 | 1235° C. | 0.25 |
| 24 | 62 | 9 | 5 | 4 | 17 | 2 | 0.8 | 0.2 | — | — | — | COKE | — | — | — | 1235° C. | |
| 25 | 53 | 14 | 9.3 | 6.7 | 7.9 | 3.2 | 1.6 | — | 1.5 | 2.6 | 0.1 | 0.1 | — | 1218 | — | 1215° C. | |
| 26 | 53.3 | 14.9 | 6.5 | 7.4 | 10.4 | 2.9 | 2.3 | — | 1.9 | — | 0.3 | CUPOLA MELT | 1330 | 1220 | 1140 | 1200° C. | |
| 27 | 53.5 | 13.2 | 8.6 | 3.3 | 13.8 | 3.1 | 2.7 | 0.3 | 1.2 | — | 0.2 | 0.2 | 1280 | 1210 | 1153 | 1195° C. | |
| 28 | 53.0 | 14.7 | 7.3 | 6.8 | 9.2 | 3.6 | 1.4 | — | 1.0 | 2.6 | 0.2 | 0.2 | 1300 | 1216 | 1150 | 1155° C. | |
| 29 | 51.6 | 15.9 | 7.2 | 6.8 | 9.2 | 3.5 | 1.7 | — | 1.2 | 2.5 | 0.2 | 0.2 | 1295 | 1213 | 1148 | 1175° C. | |
| 30 | 53.6 | 17.6 | 7.6 | 5.3 | 8.1 | 4.3 | 0.4 | — | 0.9 | 1.9 | 0.2 | 0.1 | 1355 | 1250 | — | 1225° C. | |
| 31 | 56.0 | 13.2 | 9 | 4.5 | 12.9 | 1.5 | 0.8 | 0.4 | 1.4 | — | 0.2 | 0.1 | 1322 | 1240 | 1165 | 1190° C. | |
| 32 | 56.0 | 13.1 | 9 | 5 | 14.7 | 0.4 | 0.6 | — | 0.3 | — | — | 0.9 | 1310 | 1231 | 1162 | 1200° C. | |
| 33 | 67.8 | 5.8 | 2.1 | 4.3 | 9.5 | 6.0 | 1.1 | 0.1 | 0.5 | 2.6 | 0.1 | 0.1 | — | 1300 | 1225 | 1220° C. | |

TABLE IB

Typical Batches of Row Materials and Modifiers

| Material | 9 | 10 | 11 | 12 | 13 | 14 | 15 | 16 | 17 | 18 | 19 | 20 | 21 | 22 |
|---|---|---|---|---|---|---|---|---|---|---|---|---|---|---|
| Criggion Basalt | 619 | 524 | 187 | 450 | 431 | 447 | 313 | 392 | | 303 | | | | |
| Waterswallows Basalt | | | | | 175 | 165 | | | | 313 | | | 256 | |
| Hailstones Basalt | | | | | | | | | 308 | | | 160 | | |
| Orrock Basalt | | | | | | | | | | | | | | |
| Hingston Granite | | | | | 145 | | | 466 | | | 398 | 598 | | |
| Shap Pink Granite | | | 267 | 139 | 255 | | | | 347 | 336 | 299 | | | 242 |
| Shap Track Ballast | | | | | | 253 | 227 | | | | | | | |
| Shap Biotite Hornfel | | | | | | | | | | | | | | |
| Shap Dolerite | | | | | | | | | | 343 | | 553 | | 31 |
| Grate Ash | | | | | | | | | | | | | 515 | |
| Teeside Steel Slag | | | 129 | | | | | | | | | | | |
| Whitworth sandstone | | | 277 | | | | | | | | | | | 419 |
| Bathgate sand | 111 | | | | | | | | | | | | 86 | |
| Limestone | 221 | 202 | 166 | 198 | 15 | | 167 | 204 | 74 | | 62 | 222 | 154 | 184 |
| Dolomite | | | | | 144 | 176 | 60 | 21 | | 103 | | | | 102 |
| Soda Ash | | 31 | | | | | | 27 | | | 13 | | | 22 |
| China Clay | 81 | | 111 | | | | | 32 | | | | 27 | | |
| Ulexite | | | | | | | | | | | | | | |
| Molybdenum slag | | | | | | | | | | | | | | |
| Loss of iron assumed in Cupola Melting | 24% | 60% | | | | | | | | | | | | |

| | 25 | 26 | 27 | 28 | 29 | 30 | 31 | 32 | 33 |
|---|---|---|---|---|---|---|---|---|---|
| Criggion Basalt | 91 | | | 363 | | 988 | | 63 | |
| Waterswallows Basalt | 408 | 236 | | 312 | 529 | | | | |
| Hailstones Basalt | | 436 | | | | | | | |
| Orrock Basalt | 134 | | | | | | | | |
| Hingston Granite | | | | | | | | | |
| Shap Pink Granite | 212 | | | 213 | 231 | | | | |
| Shap Track Ballast | | 202 | 387 | | | | | | |
| Shap Biotite Hornfel | | | | | | | | | |
| Shap Dolerite | 114 | | 456 | | | 535 | | | |
| Grate Ash | | | | | | | | 133 | |
| Teeside Steel Slag | | | | | | | 82 | | |

TABLE IB-continued

Typical Batches of Row Materials and Modifiers

| | | | | | | | |
|---|---|---|---|---|---|---|---|
| Whitworth sandstone | | | | | 282 | 25 | 389 |
| Bathgate sand | | | | | | | 202 |
| Limestone | | 145 | | 26 | 94 | 135 | |
| Dolomite | 125 | 18 | 66 | 43 | 61 | | 158 |
| Soda Ash | | 18 | | 14 | | | 63 |
| China Clay | | | | 112 | | 53 | 102 |
| Ulexite | 65 | | 64 | 62 | 49 | | 58 |
| Molybdenum Slag | | | | | | 601 | |
| Loss of iron assumed in Cupola Melting | 30% | | | | | | |

TABLE II

Analysis of Typical Rock Materials and Modifiers

| Material | SiO$_2$ | Al$_2$O$_3$ | CaO | MgO | B$_2$O$_3$ | Na$_2$O | K$_2$O | Fe$_2$O$_3$ | SrO | SO$_3$ | TiO$_2$ | FeO | P$_2$O$_5$ | Other Oxides | F | LOI |
|---|---|---|---|---|---|---|---|---|---|---|---|---|---|---|---|---|
| Criggion Basalt | 53.6 | 17.6 | 7.3 | 5.2 | | 4.0 | 0.4 | | | | 0.9 | 6.8 | 0.2 | 0.2 | | 3.8 |
| Waterswallows Basalt | 50.1 | 13.9 | 8.1 | 9.5 | | 2.5 | 0.6 | 11.5 | | | 1.8 | | 0.1 | 0.1 | | 1.8 |
| Hailstones Basalt | 50.3 | 16.2 | 7.8 | 4.5 | | 3.7 | 2.0 | 2.8 | | | 2.7 | 7.5 | 0.6 | 0.2 | | 1.7 |
| Orrock Basalt | 43.7 | 13.7 | 10.1 | 9.5 | | 2.7 | 1.6 | 12.2 | | | 2.6 | | 0.7 | 0.2 | | 2.7 |
| Hingston Granite | 69.3 | 15.9 | 1.0 | 0.4 | | 1.9 | 5.8 | 3.0 | 0.2 | | 0.2 | | | | | 2.2 |
| Shap Pink Granite | 69.6 | 14.4 | 1.7 | 1.4 | | 3.4 | 4.6 | 2.6 | 0.2 | | 0.6 | | 0.2 | 0.2 | 0.1 | 1.0 |
| Shap Track Ballast | 69.7 | 14.4 | 0.6 | 0.9 | | 2.3 | 5.4 | | | | 0.6 | 4.1 | 0.2 | 0.2 | | 1.6 |
| Shap Biotite Hornfel | 68.1 | 15.0 | 1.0 | 0.7 | | 2.5 | 6.0 | 4.1 | | 0.1 | 0.7 | | 0.1 | 0.2 | | 1.4 |
| Shap Dolerite | 49.1 | 14.5 | 8.5 | 5.1 | | 2.0 | 0.8 | 13.5 | | 0.7 | 2.0 | | 0.3 | 0.3 | | 3.2 |
| Grate Ash | 58.4 | 8.4 | 14.0 | 2.2 | | 5.4 | 1.6 | 2.6 | | 1.0 | 0.8 | | 1.3 | 0.3 | | 4.0 |
| Molybdenum Slag | 65.5 | 10.1 | 4.4 | 0.7 | | 0.1 | 0.5 | | | | 0.3 | 11.5 | | 1.4 | 0.5 | |
| Teeside Slag | 35.5 | 13.2 | 39.3 | 9.5 | | 0.2 | 0.5 | 0.3 | | 0.5 | 0.5 | | | 0.4 | | |
| Whitworth Sandstone | 80.3 | 8.7 | 0.6 | 1.0 | | 1.0 | 1.3 | 3.5 | | | 0.7 | | | 0.2 | | 2.7 |
| Bathgate Sand | 95.3 | 2.2 | 0.1 | 0.1 | | 0.1 | 1.4 | 0.3 | | | o.1 | | | | | 0.4 |
| Limestone | 0.2 | 0.1 | 55.6 | 0.1 | | | | | | | | | | | | 43.9 |
| Dolomite | 2.3 | 0.4 | 32.4 | 18.5 | | 0.1 | 0.1 | 0.3 | | 0.1 | | | | | | 45.7 |
| Soda Ash | | | | | | 58.3 | | | | | | | | | | 41.7 |
| China Clay | 47.4 | 36.8 | | 0.3 | | 0.1 | 1.7 | 0.8 | | | 0.2 | | | | | 12.5 |
| Ulexite | 3.3 | 0.1 | 17.2 | 1.9 | 38.9 | 6.2 | | | 0.9 | | | | | | | 31.4 |

We claim:

1. An insulation wool formulated from naturally-occurring rock minerals selected from the group consisting of basalts, granites, limestone, dolomite and sandstone, optionally including high alumina materials or boron containing minerals, or combinations thereof, having a composition consisting essentially of the following components, given in wt %, based on the total weight of the composition:

| | |
|---|---|
| SiO$_2$ | 51–68 wt % |
| Al$_2$O$_3$ | 13–16 wt % | with the total amount of SiO$_2$+Al$_2$O$_3$ being from 66 to 75 wt %,

| | |
|---|---|
| Na$_2$O | 0–6 wt % |
| K$_2$O | 0–5 wt % | with the total amount of Na$_2$O+K$_2$O being from 0 to 7.5 wt %,

| | |
|---|---|
| MgO | 1–9 wt % |
| CaO | 8–20 wt % | with the total amount of MgO+CaO being from 12 to 27 wt %,

| | |
|---|---|
| Fe$_2$O$_3$ | 2–10 wt % |
| TiO$_2$ | 0–3 wt % |
| P$_2$O$_5$ | less than 1 wt %, |
| B$_2$O$_3$ | 0–3 wt % | the composition having a liquidus temperature of 1225° C. or less, and a viscosity at least 1000 poise at the liquidus temperature.

2. An insulating wool according to claim 1, wherein the amount of SiO$_2$ is from 53 to 60 wt %.

3. An insulating wool according to claim 1, wherein the total amount of MgO+Fe$_2$O$_3$ is greater than 12 wt %.

4. An insulating wool according claim 1, consisting essentially of following components, given in wt %, based on the total weight of the composition:

| | |
|---|---|
| SiO$_2$ | 53–60 wt % |
| Al$_2$O$_3$ | 13–16 wt % | with the total amount of SiO$_2$+Al$_2$O$_3$ being from 66 to 75 wt %,

| | |
|---|---|
| Na$_2$O | 0–6 wt % |
| K$_2$O | 0–5 wt % | with the total amount of Na$_2$O+K$_2$O being from 0 to 7.5 wt %,

| | |
|---|---|
| MgO | 1–9 wt % |
| CaO | 8–18 wt % | with the total amount of MgO+CaO being from 12 to 25 wt %,

| | |
|---|---|
| $Fe_2O_3$ | 3–10 wt % |
| $TiO_2$ | 0–3 wt % |
| $P_2O_5$ | less than 1 wt % |
| $B_2O_3$ | less than 3 wt %. |

5. An insulating wool according to claim 1, wherein the amount of MgO is greater than 4.0 wt %.

6. An insulating wool according to claim 1, wherein the amount of $Fe_2O_3$ is greater than 6.0 wt %.

7. An insulating wool according to claim 6, wherein the amount of $Fe_2O_3$ is greater than 8.0 wt %.

8. An insulating wool according to claim 1 having a liquidus temperature of 1200° C. or less and a viscosity at the liquidus temperature of at least 1000 poise.

9. An insulating wool according to claim 1, wherein the amount of $SiO_2$ is from 53 to 60 wt %.

10. An insulating wool according to claim 1, wherein the total amount of $SiO_2+Al_2O_3$ is greater than 68.0 wt %.

11. An insulating wool according to claim 1, wherein the amount of $Fe_2O_3$ is greater than 3.0 wt %.

12. An insulating wool according to claim 1, wherein the amount of $SiO_2$ is from 61 to 68 wt % and the amount of $Fe_2O_3$ is less than 5 wt %.

13. AN insulating wool according to claim 1, wherein the total amount of MgO+CaO is greater than 20 wt %.

* * * * *